(12) United States Patent
Nijemcevic

(10) Patent No.: US 8,571,270 B2
(45) Date of Patent: Oct. 29, 2013

(54) SEGMENTATION OF A WORD BITMAP INTO INDIVIDUAL CHARACTERS OR GLYPHS DURING AN OCR PROCESS

(75) Inventor: Djordje Nijemcevic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 12/776,576

(22) Filed: May 10, 2010

(65) Prior Publication Data
US 2011/0274354 A1 Nov. 10, 2011

(51) Int. Cl.
*G06K 9/34* (2006.01)
(52) U.S. Cl.
USPC .............................. 382/117; 382/178; 382/179
(58) Field of Classification Search
USPC .................................................. 382/177–179
See application file for complete search history.

(56) References Cited

U.S. PATENT DOCUMENTS

| | | | |
|---|---|---|---|
| 5,384,864 A * | 1/1995 | Spitz .............................. | 382/174 |
| 5,418,864 A | 5/1995 | Murdock et al. | |
| 5,619,594 A * | 4/1997 | Melen ............................ | 382/233 |
| 5,809,166 A * | 9/1998 | Huang et al. ................... | 382/178 |
| 5,848,184 A | 12/1998 | Taylor et al. | |
| 6,721,451 B1 * | 4/2004 | Ishitani .......................... | 382/181 |
| 6,937,762 B2 | 8/2005 | Fujiwara | |
| 7,181,068 B2 | 2/2007 | Suzuki et al. | |
| 7,471,826 B1 * | 12/2008 | Navon et al. .................. | 382/171 |
| 2004/0042664 A1 | 3/2004 | Van Hall et al. | |
| 2006/0008148 A1 * | 1/2006 | Mochizuki ..................... | 382/182 |
| 2006/0072822 A1 | 4/2006 | Hatzav et al. | |
| 2007/0048012 A1 | 3/2007 | Hatzav et al. | |
| 2007/0189628 A1 | 8/2007 | Nolan et al. | |
| 2008/0304113 A1 | 12/2008 | Curry et al. | |
| 2009/0154810 A1 | 6/2009 | Enomoto et al. | |

FOREIGN PATENT DOCUMENTS

WO 2009049275 A1 4/2009

OTHER PUBLICATIONS

Casey et al. ("Strategies in character segmentation—A survey," Proc. 3rd Int'l Conf. on Document Analysis and Recognition, vol. 2 (1955) pp. 1028-1033).*
Choi et al. ("Text localization and character segmentation algorithms for automatic recognition of slab identification numbers," Optical Engineering 48(3), Mar. 2009.*
International Search Report and Written Opinion from corresponding PCT Application U.S. Appl. No. PCT/US2011/034242 dated Nov. 11, 2011, 6 pages.

(Continued)

*Primary Examiner* — Yubin Hung
(74) *Attorney, Agent, or Firm* — Mayer & Williams, PC

(57) ABSTRACT

An image processing apparatus is provided that includes a character chopper component that segments words into individual characters in a bitmap of a textual image undergoing an OCR process. The Character chopper component is configured to produce a set of (possibly curved) chop-lines which divide a bitmap of any given word into its individual character or glyph candidates. Cases where an input bitmap contains two separate words are handled by marking a place where those words should be split. The character segmentation algorithm computes the set of vertically oriented, curved chop-lines by considering glyph and background colors in a given word bitmap. The set is filtered afterwards using various heuristics, in order to preserve those lines that indeed do separate a word's glyphs and minimize the number of those that do not.

18 Claims, 4 Drawing Sheets

(56) References Cited

OTHER PUBLICATIONS

Leishman, Scott., "Shape-Free Statistical Information in Optical Character Recognition", Retrieved at <<http://www.cs.toronto.edu/~scottl/research/msc_thesis.pdf>>, Master Thesis, 2007, pp. 151.

Einsele-Aazami, Farshideh., "Recognition of Ultra Low Resolution, Anti-Aliased Text with Small Font Sizes", Retrieved at <<http://ethesis.unifr.ch/theses/downloads.php?file=EinseleF.pdf>>, 2008, pp. 162.

* cited by examiner

SEGMENTATION OF A WORD BITMAP INTO INDIVIDUAL CHARACTERS OR GLYPHS DURING AN OCR PROCESS

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an imager-based scanner, because in these cases the text/picture is scanned from a distance, from varying orientations, and in varying illumination. Even if the performance of the scanning process is good, the performance of the OCR engine may be degraded when a relatively low quality page of text is being scanned.

One part of the OCR process identifies textual lines in a bitmap of a textual image. One component of the OCR engine segments each textual line with a series of chop lines that are located between adjacent characters or glyphs. Ideally, a single character or glyph is located between pair of adjacent chop lines. In many cases, however, it is difficult to segment words into individual symbols due to poor image quality, font weight, italic text, character shape, etc.

SUMMARY

An image processing apparatus is provided that includes a Character Chopper component that segments words into individual characters in a bitmap of a textual image undergoing an OCR process. The Character Chopper component is configured to produce a set of (possibly curved) chop-lines which divide a bitmap of any given word into its individual character or glyph candidates. Cases where an input bitmap contains two separate words are handled by marking a place where those words should be split. The character segmentation algorithm computes the set of vertically oriented, curved chop-lines by considering glyph and background colors in a given word bitmap. The set is filtered afterwards using various heuristics, in order to preserve those lines that indeed do separate a word's glyphs and minimize the number of those that do not.

In one implementation, the segmentation process begins when a bitmap of an image is received. The image includes at least one textual line that is identified by a base-line and a mean-line. Next, a plurality of candidate chop lines are generated which each maximize a fitness function that increases as a total path lightness of the respective candidate chop lines increases and decreases as an intersection number increases. The intersection number denotes a number of white-to-black and black to white transitions (weighted according to their respective intensities) that the respective candidate chop line crosses. The fitness function thus selects candidate chop lines which contain more light pixels and fewer intersections with ink. At least one chop line is then selected from among the candidate chop lines. The chop line separates a pair of adjacent characters or glyphs in the textual line.

In one particular implementation, each of the candidate chop lines are assigned to one of a plurality of groups. The candidate chop lines in each group are all within a threshold logical distance from one another. The logical distance between two candidate chop lines is proportional to the sum of the inverted pixel values lying between the two candidate chop lines. A candidate chop line is selected from each group. The candidate chop line that is selected has a maximum confidence measure for its group. Any of the selected candidate chop lines are eliminated if their confidence measure is below a threshold level, thereby providing a first set of candidate chop lines. Pairs of candidate chop lines in the first set candidate chop lines are compared to one another. A first member of the pair is eliminated if its confidence measure is less than a confidence measure of a second member of the pair and if a product of the confidence measure of the second member and a decreasing function of the logical distance between the first and second members is greater than the confidence measure of the second member. In this way a second set of candidate chop lines is obtained which correspond to the final plurality of chop lines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3b shows a series of chop lines that have been calculated for the textual line shown in FIG. 3a.

DETAILED DESCRIPTION

Figure 1:
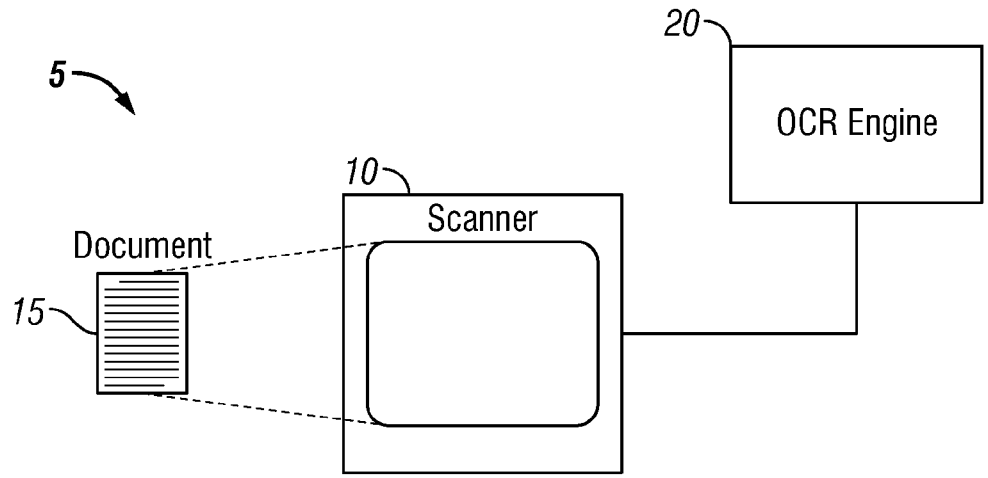
FIG. 1 shows one illustrative example of a system for performing optical character recognition (OCR) of a textual image.

FIG. 1 shows one illustrative example of a system 5 for performing optical character recognition (OCR) of a textual image. The system 5 includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The OCR engine 20 receives a textual image as a bitmap of text lines. The image may be a scanned image of text or a digital document such as a PDF or Microsoft Word document, where input data is already available. If such input data is not available, the paragraph detection component of an OCR engine is assumed to receive as input from other components of the OCR engine an image in which a list of textual lines (and possibly words) have already been identified for each page of the image. Individual lines and words are defined by line and word bounding boxes, respectively. The bounding boxes themselves are defined by a set of coordinates that are established for each.

As previously mentioned, one component of the OCR engine 20 segments each textual line with a series of chop lines that are located between adjacent characters, glyphs or ligatures, which for the purposes herein will be treated as interchangeable with one another. For convenience, the term "glyph" may from time to time be used herein to mean a glyph, a character and/or a ligature. Ideally, a single glyph is located between pair of adjacent chop lines.

In many cases, however, it is difficult to segment words into individual characters, glyphs or ligatures due to poor image quality, font weight, italic text, character shape, etc. What makes the word segmentation even more difficult is that sometimes there is no clear spatial distinction between individual glyphs in a given word's bitmap. For instance, characters can be joined, or an entire word can be underlined.

As detailed below, a character chopper component is configured to produce a set of (possibly curved) chop-lines which divide a bitmap of any given word into its individual character or glyph candidates. Cases where an input bitmap contains two separate words are handled by marking a place where those words should be split. The character segmentation algorithm computes the set of vertically oriented, curved chop-lines by considering glyph and background colors in a given word bitmap. The set is filtered afterwards using various heuristics, in order to preserve those lines that indeed do separate a word's glyphs and minimize the number of those that do not.

Figure 2:
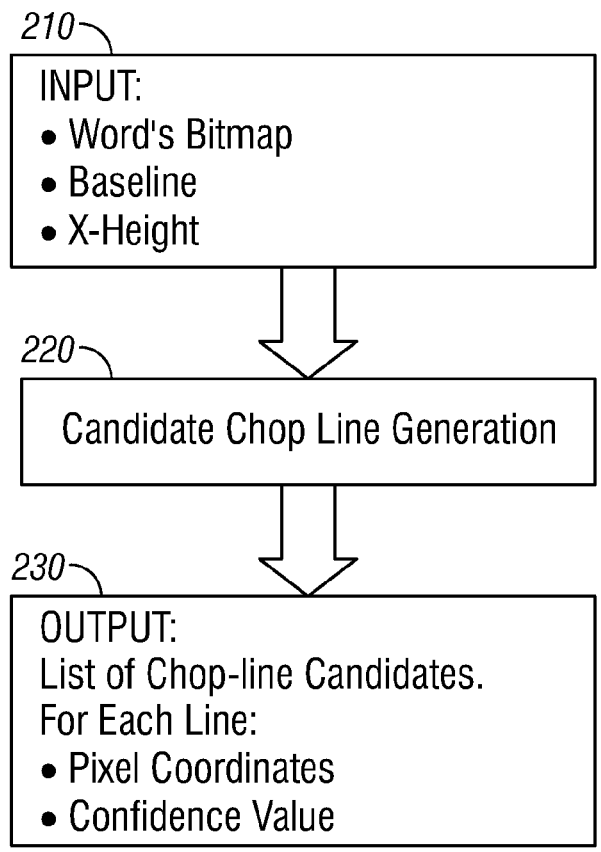
FIG. 2 shows a high level flowchart of the character chopping process for segmenting each textual line with a series of chop lines that are located between adjacent characters or glyphs.

FIG. 2 shows a high level flowchart of the character chopping process for segmenting each textual line with a series of chop lines that are located between adjacent characters or glyphs. The process begins at block 210 when a bitmap of an image is received. The bitmap includes at least one textual line of words. The textual line is identified by a base-line and a mean-line.

Figure 3A:
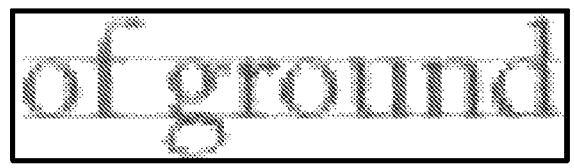
FIG. 3a shows the base-line (bottom horizontal line) and the mean-line (upper horizontal line) of a textual line that includes the words "of ground."

The base line is defined as a horizontal line passing through the bottom ends of a majority of the characters in a line of text (excluding descenders). Likewise, the "mean-line" is defined as a horizontal line which passes through the top ends of a majority of the characters in a line of text (excluding ascenders). The "x-height" is defined as the vertical distance between the base-line and the mean-line, which corresponds to the height of a majority of lowercase letters in the line (excluding non-descenders and non-ascenders). FIG. 3a shows the base-line (bottom horizontal line) and the mean-line (upper horizontal line) of a textual line that includes the words "of ground."

Figure 3B:
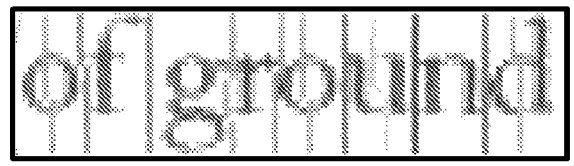

After the bitmap is received, the process continues at block 220 where candidate chop lines are generated. The candidate chop lines each separate a pair of adjacent characters or glyphs in the textual line. A confidence measure or level is calculated for each candidate chop line which reflects how accurately the chop line separates a character or glyph. FIG. 3b shows a series of chop lines that have been calculated for the textual line shown in FIG. 3a. In FIG. 3b, the darker the line the higher the confidence level. FIG. 3b also shows an inter-word chop line between the words "of" and "ground." A subset of the candidate chop lines are selected which are most likely to correspond to actual inter-character or inter-glyph chop lines.

Finally, at block 230 the process outputs the subset of chop lines for each textual line. The output includes the coordinates of each textual line, the candidate chop lines and their confidence measures. This output may be used to apply the chop line to the textual line to identify or otherwise produce the characters or glyphs.

Figure 4:
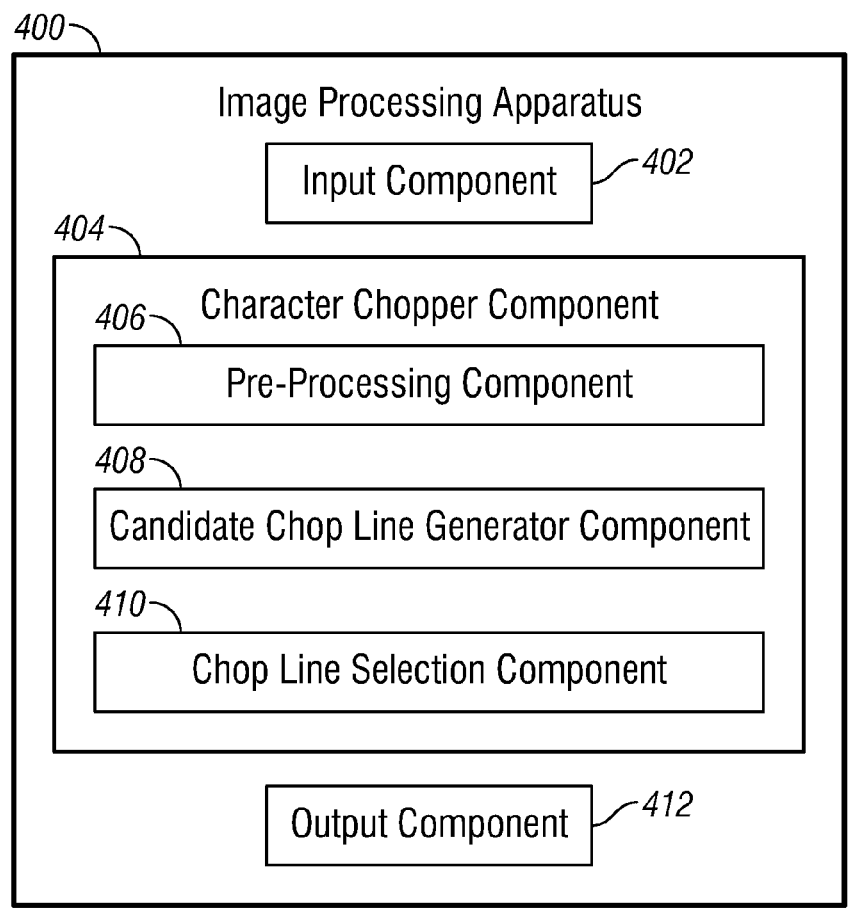
FIG. 4 shows one example of an image processing apparatus that segments words into individual characters in a bitmap of a textual image undergoing an OCR process.

FIG. 4 shows one example of an image processing apparatus 400 that segments words into individual characters in a bitmap of a textual image undergoing an OCR process. The apparatus 400, which may be incorporated in an OCR engine, includes an input component 402 for receiving an input image having textual lines which are identified by a base-line and a mean-line that have been calculated in a prior component of the OCR engine. The apparatus also includes a character chopper component 404. The character chopper component 404 includes one or more pre-processing components 406 and a candidate chop line generator component 408 for generating a plurality of chop lines that each separate a pair of adjacent characters or glyphs in the textual line. The character chopper component 404 also includes a chop line selection component 410 for selecting a subset of the candidate chop lines that correspond to the plurality of chop lines that each separate a pair of adjacent characters or glyphs in the textual line. The apparatus 400 also includes an output component 412 that generates the information concerning the chop lines which have been generated in a form that allows it to be employed by subsequent components of the OCR engine. The subsequent component may be, for instance, a word search component that employs an algorithm such as a beam search algorithm that recognizes the words that the characters make up.

As mentioned above, the output from the system is a reasonably small set of (possibly curved) chop-lines extending from a word's top down to its bottom. While this set should properly chop the word's bitmap into individual character or glyph bitmaps, it is possible (although not desirable) for the set to have some additional (i.e., false) chop-lines (i.e. chop lines that chop some individual glyphs). If the system is "sure" that some particular chop-line in the output set is indeed an inter-glyph chop, it will flag it in an appropriate manner. Sometimes, however, due to word-segmentation errors, it may be possible that two consecutive words in a textual line received as part of the input bitmap to the system are treated as one bitmap. In such a case, the output set of chop lines will contain a line that splits the leftmost glyph of the first word and the rightmost glyph of the second word. The system will generally flag such a chop line as a potential inter-word chop.

An overview of the process by which chop lines are determined will now be presented. After this overview a more detailed discussion will be presented of a particular algorithm that may be employed to implement the process. This presentation will include a number of examples to further facilitate an understanding of the process.

Chop Line Computation Overview

Each chop-line determined by the character chopper component can be constructed using a number of anchor points, which will be defined below. While the number can vary from 0 to h, where h is bitmap height of the input image in pixels, the following examples will employ only a single anchor point. Given an input bitmap of height h and width w, the character chopper component computes a set of candidate chop-lines in two steps.

In the first step, an initial set of candidate chop-lines is computed using dynamic programming. One way to accomplish this is as follows. For each pixel along a central row of a word in a textual line the character chopper computes the most optimal vertically oriented chop-line containing that pixel. The central row is a row of pixels lying exactly between the base-line and the mean-line. Each of these pixels along the central row serves as the anchor point for its respective chop line. The chop line is constructed in such a way that it selects one and only one pixel from each row of the bitmap above and below the pixel on the central row. Moreover, the x-coordinate values of two pixels in a chop line selected from adjacent rows cannot differ by more than 1 pixel. This ensures that the chop line is a single, fully connected line. Since a chop line is computed for each pixel along the central row, w chop lines will be generated for an input bitmap having a width of w pixels. These chop lines constitute the set of candidate chop lines. Each candidate chop line will have a height of h pixels and will therefore contain exactly h pixels.

Once the w candidate chop lines have been computed, the second step of the chop line computation process is performed. In this step at least one subset of chop lines is selected from among the total set of candidate chop lines such that, for each pair of adjacent characters or glyphs in the word's bitmap, there exists at least one chop line in the subset that properly separates them. The process of selecting the proper subset of candidate chop lines which separate characters or glyphs can be computationally difficult. Accordingly, a chop line filtering process is employed in which various heuristics are used to reduce the number of candidate chop lines. One example of this filtering process will also be described in more detail below.

Computation of Candidate Chop Lines

As mentioned above, given an input bitmap h pixels in height and w pixels in width, a set of w candidate chop-lines is computed. The set is bijectively mapped to central row pixels—$j^{th}$ line ($0<=j<w$) corresponds to $j^{th}$ pixel of the central row. The line computation may be accomplished using dynamic programming.

Each candidate chop line that is computed is optimized to maximize the likelihood that it represents an actual chop line between characters or glyphs. That is, out of all the potential lines that may be formed through an anchor pixel, the candidate chop line represents the line that is most likely to represent an actual chop line. In order to identify such optimal chop lines, a line "optimality" criterion is chosen.

In one implementation the optimality criterion is selected to be a function of two properties of each line: its "path lightness," which represents an overall luminance of the pixels that make up the line, and its "intersection count," which reflects the number of white-to-black and black-to-white transitions that the line exhibits. This number may be weighted to take into account the intensity of the transition so that more intense transitions are given more weight. In other words, the optimal line though an anchor point that is selected as the candidate chop line is that line which contains more light pixels and fewer intersections with ink, which defines the foreground text in an image. A brief explanation of the rationale for using both components of this optimality criterion will now be presented.

A criterion that solely examines path lightness is not a good optimality criterion because in some cases (such as when two adjacent glyphs touch one another) an intersection cannot be avoided. For instance, in one case a line may cut the letter 'o' in half, thus having two intersections with a single glyph while crossing a relatively small number of black pixels (due to the printing quality of the letter 'o'). In another case a line may properly chop the "ry" string, which in some fonts is printed as a single glyph (with 'r' and 'y' joined at the top), and thus the line only intersects once with foreground ink. However, the line in the second case may potentially cross the same number of black pixels as the first line. Clearly, in order to determine that the line in the second case has a higher probability of being an actual chop-line, path lightness cannot be the only criterion.

Similarly, a criterion that only examines the number of intersections is also not a good optimality criterion. For instance, in one case a chop-line may enter the letter "l" at its top, and exit it at the bottom, making one white-to-black and one black-to-white intersection. In another case a chop line may intersect two underlined glyphs that touch one another where they are underlined. The lines in the first and second case will thus have the same intersection count. Clearly, in order to determine that the line in the second case has a higher probability of being an actual chop-line, intersection count cannot be the only criterion.

A candidate chop-line's path lightness may be computed by summing weighted pixel values across the line. The weighting factors arise from differences in background color and are produced by a background filtering component in the OCR engine. The intersection count can be computed by summing weighted luminance differences of spatially close pixels on a chop-line. An illustrative method for determining the path lightness and intersection count and for combining them into the optimality criterion will be provided below.

In one implementation two halves of a candidate chop line are computed separately from one another and then combined. One half may correspond to the portion of the chop line above the central row and the other half may correspond to the portion of the chop line below the central row. In particular, a chop-line corresponding to pixel p, on the central row is composed of an upper and lower half line. The upper half-line starts at p, and ends at some (determined by the half-line's shape) pixel at the bitmap's first or top row. The lower half-line starts at p, as well, and ends at some pixel at the bitmap's last or bottom row. The two half-lines are computed separately using the optimality criterion described in the following section and joined afterward into a final candidate chop-line.

The upper and lower half-lines are both computed in a similar fashion. Thus, only the computation of the upper half-line will be described herein. The half-line is computed row-after-row (starting from the first or top row) using dynamic programming. To describe the half-line computation, the following terms/data structures are defined (consider $0 \le i \le h/2$, $0 \le j < w$):

Optimal line (i, j): A line computed by the algorithm, having its first pixel somewhere on the bitmap's first or top row, and its last pixel in the bitmap's $i^{th}$ row and $j^{th}$ column.

Optimal line (i, j, k): Value of $k^{th}$ pixel in Optimal line (i, j)

intersectionCount[i,j]=$\Sigma_{k=1}^{j}$ abs (Optimal line (i,j,k)−Optimal line (i,j,k−1))

lightness[i,j]=$\Sigma_{k=0}^{j}$ Optimal line (i,j,k)

$$FitnessFunc(a, b, B_{CLAMP}) = a * \left(1.0 - \frac{\min(b, B_{CLAMP})}{B_{CLAMP}}\right) \quad (1)$$

where $B_{CLAMP}$ is a constant for normalization purposes fitness[i,j]: Measure of optimal line (i,j)'s quality. It is computed from the following formula:

fitness[$i,j$]=FitnessFunc(lightness[$i,j$],intersection-
Count[$i,j$],INTERSECTIONMAX) (2)

Clearly, the higher the lightness, the higher the fitness. On the other hand, the higher the (normalized) intersection count, the lower the fitness becomes. The INTERSECTIONMAX clamp constant $B_{CLAMP}$ is chosen empirically.

Once the fitness is computed for the $i^{th}$ row, the computation for the $(i+1)^{th}$ row is done using the following formula:

$$\text{fitness}[i+1, j] = \qquad (3)$$

$$\max \begin{cases} FitnessFunc\begin{pmatrix} \text{lightness}[i, j-1] + img[i+1, j], \\ \text{intersectionCount}[i, j-1] + \\ abs(img[i+1, j] - img[i, j-1]), M \end{pmatrix} \\ FitnessFunc\begin{pmatrix} \text{lightness}[i, j] + img[i+1, j], \\ \text{intersectionCount}[i, j] + \\ abs(img[i+1, j] - img[i, j]), M \end{pmatrix} \\ FitnessFunc\begin{pmatrix} \text{lightness}[i, j+1] + img[i+1, j], \\ \text{intersectionCount}[i, j+1] + \\ abs(img[i+1, j] - img[i, j+1]), M \end{pmatrix} \end{cases}$$

Where:
  img is the input bitmap
  M is an empirically chosen clamp constant (INTERSECTIONMAX in (2))

The reasoning behind this is rather simple: for each pixel in the row currently being processed, the algorithm analyzes whether it is "cheaper" (i.e., maximizes the fitness function) to reach that pixel from its upper-left, upper, or upper-right neighbor. After processing the central row, the fitness[h/2,j] (0≤j<w) will reflect the line quality measurement values for all of the w upper half-lines, and each one of them will be "optimal" starting from its own (and unique) pixel on the central row.

There may be an additional penalty for diagonal (upper-left and upper-right) transitions in eq. 3, which is omitted for clarity. The penalty coefficients may be different if the analyzed word is in italic style. The detection of italic text will be described in a separate section below.

When finding the value of the fitness[i+1,j] in formula (3), the lightness[i+1,j] and intersectionCount[i+1,j] are computed depending on which term from eq. (3) is chosen as the maximum one.

Figure 5:
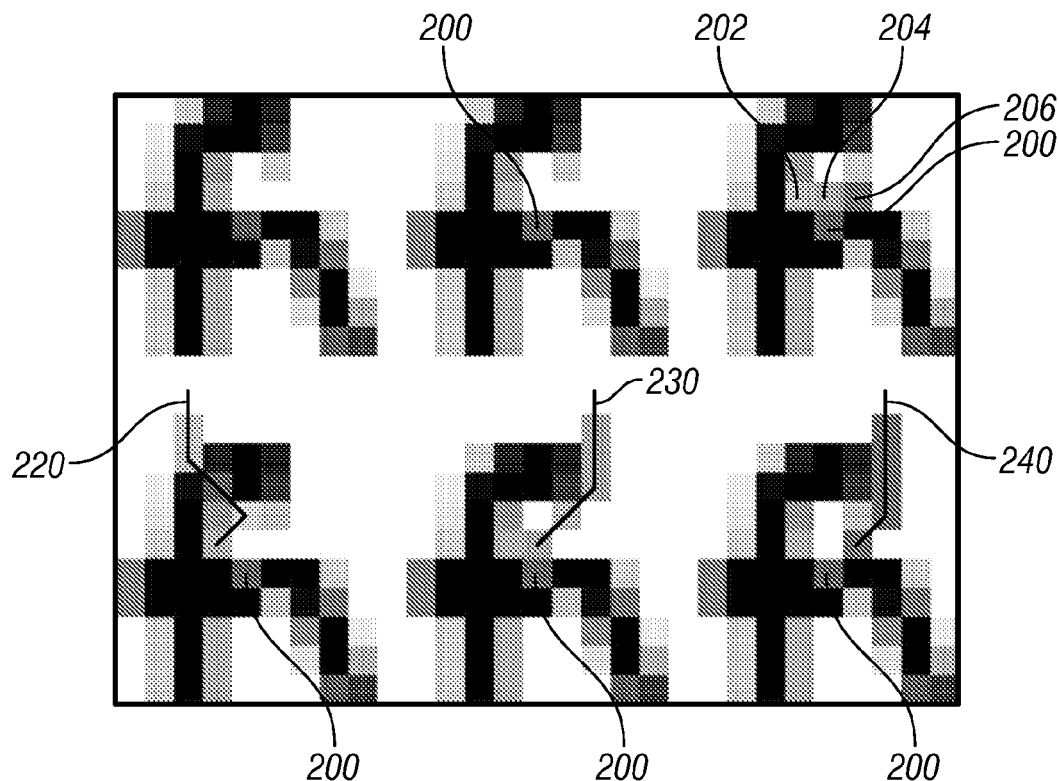
FIG. 5 shows a sequence in which the optimal half-line is determined for the upper part of the bigram "fy."

The algorithm for determining a half-line is illustrated in connection with FIG. 5, which shows an original image (the upper part of the bigram "fy") in the top left portion of the figure. A single target pixel 200 is selected (top middle portion of FIG. 5). As shown in the top right portion of FIG. 5, the optimal path through the pixel 200 will contain either the neighboring pixel to its top-left (pixel 202), top (pixel 204) or top-right (pixel 206). Since the chop line computation process begins on the image's top row and continues downward, it can be assumed that optimal chop line paths containing those three pixels have already computed (line 220 in bottom-left, line 230 in bottom-middle and line 240 in bottom-right pictures in FIG. 5). For those three paths that have already been calculated, plus the target pixel, three 3 fitness functions are computed and compared to one another. The path with the largest fitness is selected as the optimal path for the target pixel. This process continues for each pixel on the current row, which is then repeated until the last row is reached. In the half line approach the last row will be the central row. The entire process is then performed for the lower half of the input image (not shown in FIG. 5). Finally, for each pixel along the central row, the upper and lower half-lines that have been calculated are joined together to form a candidate chop line.

After the candidate chop lines have been computed their respective confidences may be determined. One way to derive the confidence measure is as follows. First, the path lightness is transformed so that it lies within some predefined range, which in this example is chosen to be from 0.0 to 1.0. In theory, the value of the lightness cannot exceed the product of the maximum pixel value and the bitmap's height, so this constant (maxlight) can be used as a scaling factor. Moreover, it is possible to empirically choose some non-zero value (minlight) such that lines with a lightness lower than this value can never be considered as proper chop line candidates. For example, a line entering the "l" letter at its top, and exiting at its bottom, has, say, around 80% of its length in the dark area occupied by ink, and thus can be safely omitted from analysis. To put more emphasis on a value reflecting the line's quality, lightness values between minlight and maxlight may be linearly interpolated to the (0.0, 1.0) range, while those below minlight are clamped to zero. This scaled lightness value is then multiplied by the term in parenthesis from eq. (1) describing the intersection count, which will be in the range of (0.0 to 1.0).

Candidate Chop Line Filtering

As previously mentioned, after the set of candidate chop lines has been determined, at least one subset of the lines is selected such that for each pair of adjacent characters or glyphs in a word's bitmap, there exists one and only one chop line in the subset that properly separates them. Since this can be a computationally intensive task, the candidate chop lines are filtered to reduce the size of the set as much as possible in a computationally efficient way, while retaining the correct subset of chop lines.

The filtering algorithm employs a metric that will be referred to as the chop-line logical distance. The chop-line logical distance is defined as the sum of the inverted pixel values from the input bitmap which lie between two chop-lines. Thus, the darker these pixels become, the greater the chop line logical distance between those two lines becomes. Conversely, if only a pure white background lies between some two particular chop lines, the logical distance between them will be equal to zero.

The initial set of w candidate chop lines are first arranged in a strictly ascending order by the location of their anchor pixel along the input bitmap's central row. The lines are then arranged into groups based on their logical distance. Any lines that are within a certain threshold logical distance from line 0 are added to the first group. The first line that exceeds the threshold is added to a second group. This first line in the second group is then used as a new reference line so that any subsequent lines that are within a second threshold logical distance of it are added to the second group. This process is repeated until the last line is reached. The threshold values are chosen empirically. Before comparing logical distances to the threshold, they are normalized (divided by their squared x-height value), to compensate for different input bitmap sizes.

Next, a line is selected from each group which has the greatest confidence measure. All the other lines are filteredout. Any candidate chop line in this newly established set of lines is also filtered out if its confidence is below some threshold value. A second filtering step is then performed by examining the local neighborhood (in terms of logical distance) surrounding each member of this newly formed group. This neighborhood is searched for any additional lines that can be filtered out. For instance, suppose two lines A and B which are both members of the newly formed group are in the same local neighborhood and confidence$_A$>confidence$_B$. Depending on the logical distance of A and B and their confidences ratio, line B may or may not be filtered out. In particular, confidence$_A$ is multiplied by a decreasing (e.g., exponentially) function of the logical distance between lines A and B after the logical distance has been normalized within the range of 0.0 to 1.0. If this product is higher than the value of confidence$_B$, line B will be filtered out. The logic behind this approach is that "weak" lines lying close to "strong" lines should be excluded from further analysis.

In some cases the filtering algorithm may include a weighting function to provide a logical distance weighting measure. The reason for this is that it may be useful to differentiate if ink lying between two chop-lines is situated near the input bitmap's central row, or somewhere near its top or bottom. In particular, two candidate chop lines that have ink between them located at the input bitmap's top or bottom may be marked as logically "farther" than some other two lines having the same amount of ink or "blackness" between them, but which are located directly along the central row. This is an empirically derived heuristic that can be easily illustrated. For instance, two lines are not "logically close" if there is a punctuation glyph (thus, a small amount of "blackness") between them. Since punctuation glyphs lie either near the input bitmap's top or near its bottom, this heuristic makes intuitive sense. The modification to the original logical distance computation algorithm that is needed to take such a weighting factor into account is straightforward—the computed sum of the pixel values for each row is simply multiplied by a specific, row-wise scaling factor.

The filtering algorithm may also reduce in weight or even filter out chop lines that are too curvy (where curviness is computed as an x-coordinate difference between the line's top and bottom pixel). Conversely, the filtering algorithm may give lines that are "straight" additional weight.

It is sometimes possible that a certain number of low-confidence lines exist between two high-confidence lines even after the filtering described above has been performed. This may arise, for example, when a collection of lines pass through the diagonal part of the letter "N." To account for this situation, only a small, fixed number of low-confidence lines may be allowed to exist between two "reasonably close" high-confidence ones.

Figure 6:
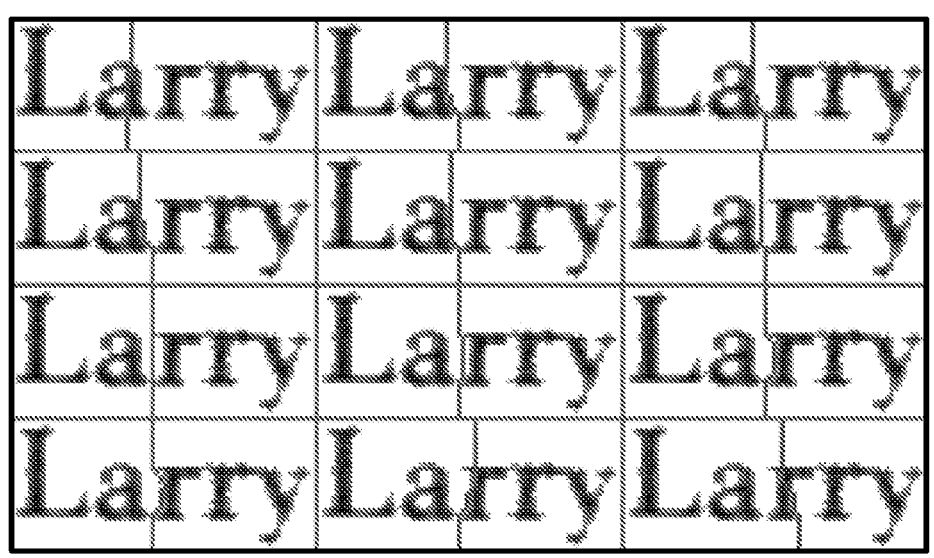
FIG. 6 shows a series of twelve consecutive candidate chop lines through the word "Larry" for the purpose of illustrating the concept of logical distance.

The concept of logical distance may be illustrated in connection with FIG. 6, which shows a series of 12 consecutive candidate chop lines through the word "Larry." That is, each candidate chop line has the x-coordinate of its anchor point increased by 1 with respect to the preceding candidate chop line. The sequence shown in FIG. 6 follows normal reading order beginning with the upper left word and continuing from left to right and top to bottom. It can be observed that there is a significant amount of ink between lines 1 and 2 (the lower part of "a" letter), and between lines 11 and 12 (the lower part of "r" letter). However, there is not much ink between lines 2 and 3, lines 2 and 4, lines 2 and 5, and so on, all the way to lines 2 and 11. Accordingly, lines 2 and 11 are still logically close to one another. Lines 2 to 11 will therefore likely belong to the same group, and thus all the lines that are illustrated except the maximum-confidence one will be filtered out.

In addition to a confidence measure, additional information or annotations may be determined which are then associated with the candidate chop lines. For instance, a candidate chop line may be designated as an actual cop line if it doesn't overlap with the background, and if its nearest surrounding neighborhood from the un-filtered set of candidate chop lines consists only of high confidence lines that do not overlap with the background. The size of the nearest surrounding neighborhood may be chosen empirically, as may high confidence threshold needed to designate a line as a high confidence line. As another example, a candidate chop line may be designated as an inter-word chop line if it meets the same conditions required for an actual chop line, except that the size of its nearest surrounding neighborhood exceeds the size of the surrounding neighborhood for a line designated as an actual chop line by a certain amount (which may also be empirically determined).

Pre-Processing Steps

A number of pre-processing steps may be performed before segmenting words in a textual line into individual characters or glyphs. For example, the chop lines for italic text will clearly have a different dominant slope from un-italicized text and thus text that is italicized may be recognized as such in a pre-processing step. Likewise, in some cases two characters or glyphs will touch one another, making the segmentation process more difficult. Thus it would be helpful to identify such characters or glyphs before determining the candidate chop lines during the segmentation process.

Regarding italicized text, the dominant slope of the chop-lines for italic text will clearly be different in comparison to normal text. The dominant chop-line slope may be favored by expanding eq. 3 to applying different penalty coefficients to chop lines that slope in different directions. However, before changing these coefficients, it is necessary to detect if a given word is in italic style.

The detection of italicized text can be performed as follows. Let vproj[j] be the sum of pixel values in the $j^{th}$ column of a given word's bitmap. The projection will have a certain number of peaks and valleys arising from inter-glyph spacing and dominant vertical glyph parts respectively. Peaks and valleys are going to appear in alternating order. In the case of "normal" text style, these "oscillations" are generally more visible than in italic text because the dominant parts of a character or glyph and the spaces between them are not as vertical as in the case of normal, un-italicized text.

As an example, if the same word in one style is skewed to the left by a certain angle with respect to the same word in another style, two cases may arise:

1. The original word is printed in normal style. The skewed version of the word will look similar to italic style, and the vproj oscillations in the first case will be more visible.

2. The original word is printed in italic style. The skewed version of the word will look similar to normal style, and the vproj oscillations in the second case will be more visible.

These heuristics may be used to detect italic style. There are many ways to compute a value that reflects oscillation strength. One of them may be:

$$\text{osc\_strength} = \sum_j (vproj[j] - \text{vproj\_avg})^2$$

Where vproj_avg is an average value of the vproj array.

In regard to the case of two characters or glyphs that touch one another, the segmentation algorithm described above will fail if two characters or glyphs share a large vertical portion of an ink. For example, a pair of "o"'s can sometimes appear "glued" to one another. To handle those cases, a simple pre-processing stage is added before chop-line computation. The stage operates in the following way:

1. Top and bottom text contours are computed from the input bitmap. Let the bitmap's width be denoted as w. For each x coordinate (x=0 . . . w−1), the top contour tracks the y-coordinate of the first non-background pixel in a row x, looking from the bitmap's top. Likewise, the bottom contour tracks the y-coordinate of the first non-background pixel in a row x, looking from the bitmap's bottom.

2. Due to the shape of the character or glyph, there will be a local minima in the top contour ("valleys") and a local maxima in the bottom contour ("hills"). If there is an x coordinate where a valley in the top contour is above the hill in the bottom contour, there is a high probability that this x coordinate corresponds to a place where two characters or glyphs touch one another.

3. Once these local minima and maxima are identified the shortest path between them is computed. Non-background pixels on the shortest path are then lightened in order to facilitate the identification of a potential chop-line candidate at that location. This modification to the input bitmap allows the chop-line computation stage to identify potential chop-lines even in cases where two touching characters or glyphs would otherwise be difficult to segment.

Figure 7:
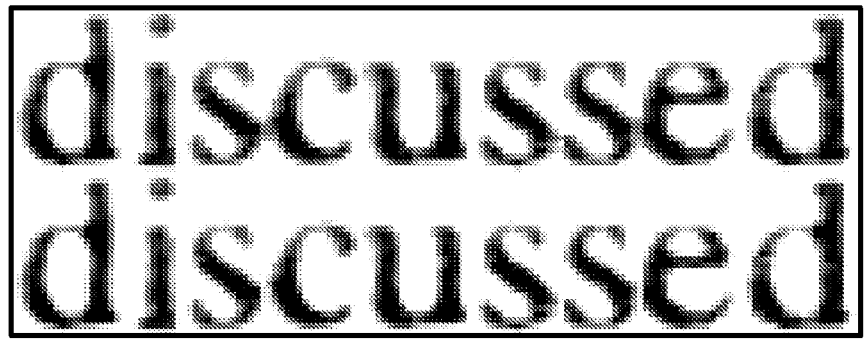
FIG. 7 illustrates a pre-processing step in which adjacent characters in a bitmap of a word touch one another.

The process of modifying the input bitmap in this manner is illustrated in FIG. 7. In FIG. 7 the original bitmap is shown on top. The bottom bitmap has been modified to lighten the non-background pixels along the line connecting the local minima and maxima in the top and bottom contours that arise between the bigrams "sc" "ss" and "se.

Figure 8:
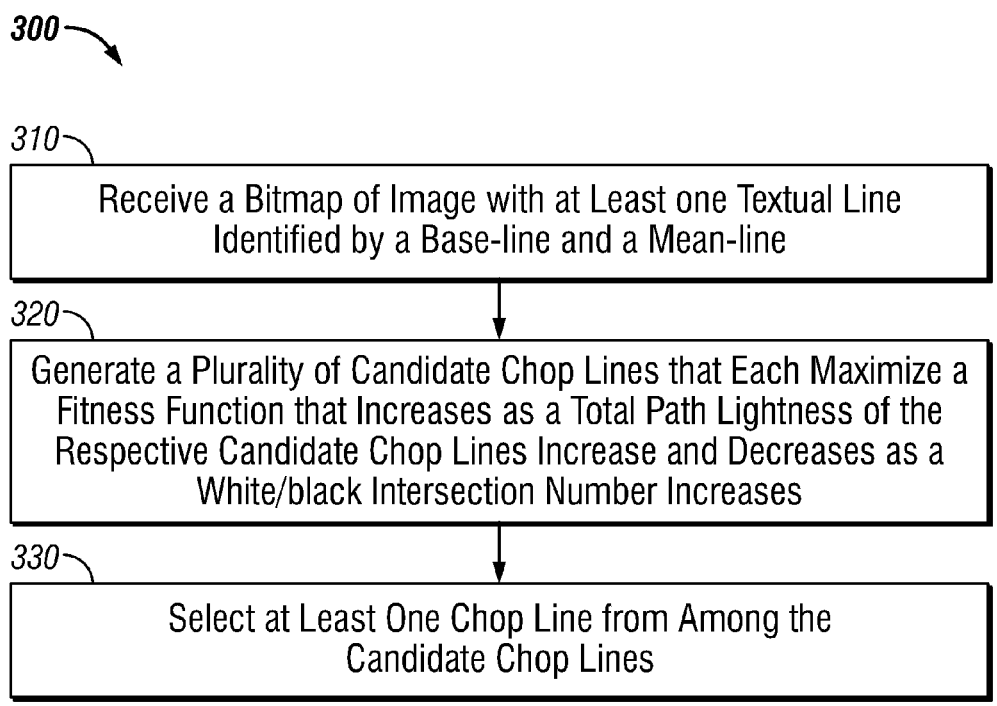
FIG. 8 shows one example of a method for segmenting words in a bitmap of an image into characters or glyphs.

FIG. 8 shows one example of a method 300 for segmenting words in a bitmap of an image into characters or glyphs. The method 300 begins in step 310 when a bitmap of an image is received. The image includes at least one textual line that is identified by a base-line and a mean-line. Next, in step 320 a plurality of candidate chop lines are generated which each maximize a fitness function that increases as a total path lightness of the respective candidate chop lines increases and decreases as an intersection number increases. The intersection number denotes a number of white-to-black and black to white transitions that the respective candidate chop line crosses. At least one chop line is selected from among the candidate chop lines in step 330. The chop line separates a pair of adjacent characters or glyphs in the textual line.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus that generates characters or glyphs from a bitmap of text, comprising:
   a processor;
   memory, when operatively coupled to the processor, implementing:
   an input component for receiving a bitmap of an image comprising at least one textual line that is identified by a base-line and a mean-line;
   a character chopper component that includes a candidate chop line generator component for generating a plurality of chop lines that each separate a pair of adjacent characters or glyphs in the textual line, wherein the candidate chop line generator component is configured to produce a candidate chop line through each pixel in at least one row extending along and within the textual line, said character chopper component further including a chop line selection component for selecting a subset of the candidate chop lines that correspond to the plurality of chop lines that each separate a pair of adjacent characters or glyphs in the textual line; and
   an output component that applies the chop line to the textual line to produce the characters or glyphs,
   wherein the candidate chop line generator component generates candidate chop lines that each maximize a fitness function that increases as a total path lightness of the respective candidate chop lines increases and decreases as an intersection number increases, wherein the intersection number denotes a number of white-to-black and black to white transitions that the respective candidate chop line crosses.

2. The apparatus of claim 1 wherein the candidate chop line generator component extends each of the character chop lines for additional pixel rows extending along and within the textual line while continuing to maximize each character chop line.

3. The apparatus of claim 2 wherein the additional pixel rows include all pixel rows within the textual line.

4. The apparatus of claim 1 wherein the at least one row is a central row halfway between a base line and a mean line of the textual line and the character chopper component is configured to separately produce candidate chop half-lines above and below the central row which are subsequently joined together.

5. The apparatus of claim 1 wherein the character chop line generator component generates a confidence measure associated with each chop line which reflects how accurately the chop line separates a character or glyph.

6. The apparatus of claim 5 wherein the confidence measure depends on a product of a scaled path lightness and an intersection number, wherein the scaled path lightness is assigned a value of zero for path lightness values below a threshold level.

7. The apparatus of claim 1 wherein the chop line selection component selects the subset of candidate chop lines by:
assigning each of the candidate chop lines to a plurality of groups, wherein the candidate chop lines in each group are all within a threshold logical distance from one another, said logical distance between two candidate chop lines being proportional to a sum of inverted pixel values lying between the two candidate chop lines;
selecting a candidate chop line from each group that has a maximum confidence measure;
eliminating any of the selected candidate chop lines if their confidence measure is below a threshold level to thereby provide a first set of candidate chop lines; and
comparing pairs of candidate chop lines in the first set candidate chop lines and eliminating a first member of a compared pair if its confidence measure is less than a confidence measure of a second member of the pair and if a product of the confidence measure of the second member and a decreasing function of the logical distance between the first and second members is greater than the confidence measure of the second member to thereby provide a second set of candidate chop lines which are designated to be the subset of the candidate chop lines that correspond to the plurality of chop lines.

8. The apparatus of claim 7 wherein the logical distance between two candidate chop lines is proportional to a weighted sum of the inverted pixel values lying between the two candidate chop lines, wherein inverted pixel values of pixels closer to a central line through the textual line are weighted more than inverted pixel values of pixels more remote from the central line toward either the mean-line or the base-line.

9. The apparatus of claim 7 wherein the chop line selection component eliminates selected candidate chop lines that do not overlap any background regions of the image that do not contain text and for which there are no additional candidate chop lines within a specified distance of the selected candidate chop lines such that the additional candidate chop lines do not overlap any background regions of the image that do not contain text.

10. The apparatus of claim 1 wherein the character chopper component includes a first pre-processing component for detecting adjacent glyphs or characters that are in contact with one another such that they share a vertical portion of text, said detection component being configured to identify top and bottom contours defined by y-coordinates of non-background pixels in top and bottom rows of the image and detect a local minima in the top contour and a local maxima in the bottom contour having a common x-coordinate, said character detection component being further configured to lighten a value of pixels located on a vertical line connecting the local minima to the local maxima.

11. The apparatus of claim 10 wherein the character chopper component includes a second pre-processing component that detects italicized characters in the textual line based on a measure of oscillations in a sum of pixel values in columns of the image.

12. A method for segmenting words in a bitmap of an image into characters or glyphs, comprising:
receiving a bitmap of an image comprising at least one textual line that is identified by a base-line and a mean-line;
generating a plurality of chop lines that each separate a pair of adjacent characters or glyphs in the textual line by producing a candidate chop line through each pixel in at least one row extending along and within the textual line; and
selecting a subset of the candidate chop lines that correspond to the plurality of chop lines that each separate a pair of adjacent characters or glyphs in the textual line;
wherein generating the plurality of chop lines includes generating the candidate chop lines so that they each maximize a fitness function that increases as a total path lightness of the respective candidate chop lines increases and decreases as an intersection number increases, wherein the intersection number denotes a number of white-to-black and black to white transitions that the respective candidate chop line crosses.

13. The method of claim 12 further comprising extending each of the character chop lines for each pixel row extending along and within the textual line while continuing to maximize each character chop line.

14. The method of claim 12 wherein the at least one row is a central row halfway between a base line and a mean line of the textual line and the character chopper component is configured to separately produce candidate chop half-lines above and below the central row which are subsequently joined together.

15. The method of claim 12 further comprising generating a confidence measure associated with each chop line which reflects how accurately the chop line separates a character or glyph, the confidence measure depending on a product of a scaled path lightness and an intersection number, wherein the scaled path lightness is assigned a value of zero for path lightness values below a threshold level.

16. A method for segmenting words in a bitmap of an image into characters or glyphs, comprising:
receiving a bitmap of an image comprising at least one textual line that is identified by a base-line and a mean-line;
generating a plurality of candidate chop lines that each maximize a fitness function that increases as a total path lightness of the respective candidate chop lines increase and decreases as an intersection number increases, wherein the intersection number denotes a number of white-to-black and black to white transitions that the respective candidate chop line crosses;
selecting at least one chop line from among the candidate chop lines, wherein the chop line separates a pair of adjacent characters or glyphs in the textual line;
applying the chop line to the textual line to produce the characters or glyphs from the received bitmap of the image.

17. The method of claim 16 wherein each of the candidate chop lines pass through a different pixel in at least one row extending along and within the textual line.

18. The of method claim 16 wherein the chop line selection is further arranged for:
assigning each of the candidate chop lines to a plurality of groups, wherein the candidate chop lines in each group are all within a threshold logical distance from one another, said logical distance between two candidate chop lines being proportional to a sum of inverted pixel values lying between the two candidate chop lines;
selecting a candidate chop line from each group that has a maximum confidence measure;
eliminating any of the selected candidate chop lines if their confidence measure is below a threshold level to thereby provide a first set of candidate chop lines; and
comparing pairs of candidate chop lines in the first set candidate chop lines and eliminating a first member of the pair if its confidence measure is less than a confidence measure of a second member of the pair and if a product of the confidence measure of the second member and a decreasing function of the logical distance between the first and second members is greater than the confidence measure of the second member to thereby provide a second set of candidate chop lines which are designated to be the subset of the candidate chop lines that correspond to the at least one chop line.

\* \* \* \* \*